H. V. STUTH.
UNLOADING APPARATUS FOR VEHICLES.
APPLICATION FILED JAN. 24, 1921.

1,414,600.

Patented May 2, 1922.

INVENTOR
Hugo V. Stuth

UNITED STATES PATENT OFFICE.

HUGO V. STUTH, OF TACOMA, WASHINGTON.

UNLOADING APPARATUS FOR VEHICLES.

1,414,600.   Specification of Letters Patent.   Patented May 2, 1922.

Application filed January 24, 1921. Serial No. 439,612.

*To all whom it may concern:*

Be it known that I, HUGO V. STUTH, a citizen of the United States, residing at Tacoma, in the county of Pierce and State of Washington, have invented certain new and useful Improvements in Unloading Apparatus for Vehicles, of which the following is a specification.

This invention relates to improvements in unloading apparatus for vehicles and the object of this improvement is to provide load supporting means that is movable relative to the vehicle frame on which it is mounted and that may be moved into a substantially balanced position from which it may be readily tilted to discharge a load clear of the vehicle on which the unloading apparatus is installed.

Another object is to provide unloading apparatus comprising a movable load carrying body that is mounted on a supporting frame and guided for movement thereon by means that will hold the load carrying body in a horizontal plane until it has been moved into a substantially balanced position and that will then permit the load carrying body to tilt into a dumping position, the said means including track members extending in the same direction in which the load carrying body is arranged to move and curved downwardly at the ends and also including connecting devices rigid with the central portion of the load carrying body and having rollers arranged to run within the track members which normally hold the load carrying body in a horizontal plane but permit such body to tilt when the rollers encounter the curved portions at the ends of the track members.

Another object is to provide means in addition to the curved tracks and the roller connections for tilting the load carrying body when it reaches the correct position for dumping.

A further object is to provide unloading apparatus of this nature in which the load supporting means is arranged to be moved by power taken from the power plant of the vehicle on which the apparatus is installed.

A further object is to provide unloading apparatus of this nature that is strong and durable in construction, reliable and efficient in operation, not expensive to manufacture and that may readily be installed on motor trucks and other load carrying vehicles of the form now in common use.

Further and more specific objects reside in the novel construction, adaptation and combination of parts of unloading apparatus for vehicles as will be more clearly hereinafter described and claimed.

In the accompanying drawings Figure 1 is a view in end elevation of apparatus constructed in accordance with this invention as it may appear when installed on a truck, parts being broken away and other parts being shown in cross section.

Like reference numerals designate like parts throughout the several views.

Figure 2:
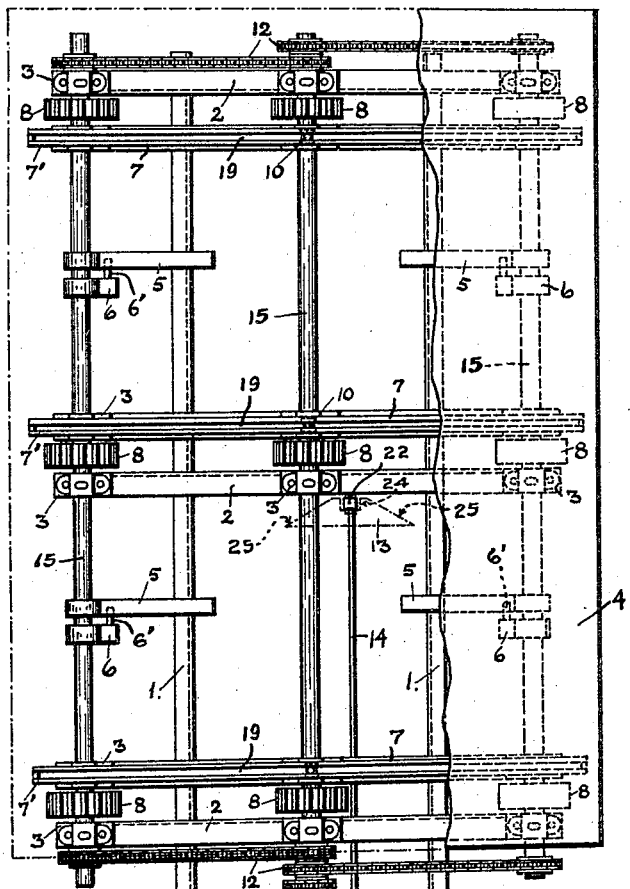
Fig. 2 is a plan view of the device showing a portion of the deck platform broken away and showing parts only of the truck frame.
Figure 3:
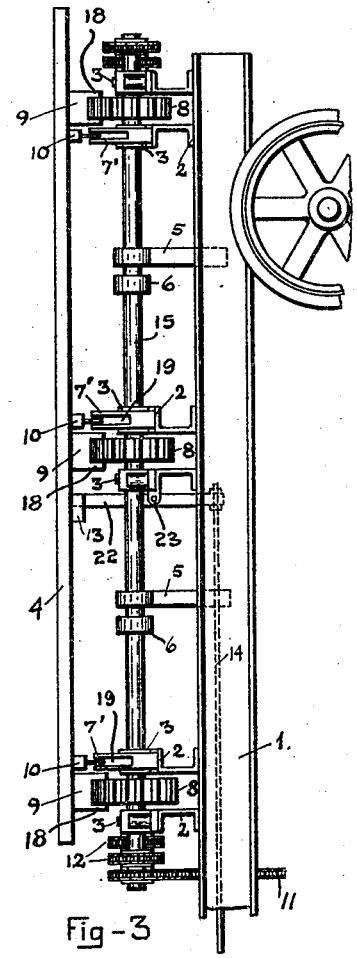
Fig. 3 is a view in side elevation of the device showing parts of the truck frame broken away.

In this application I have disclosed a load carrying body that is arranged to discharge to either side of the vehicle but it will be readily understood that if the several parts are arranged so as to move the body lengthwise instead of crosswise of the vehicle it may be made to discharge from either one or both ends of the vehicle.

In the accompanying drawings I have shown the invention as applied to a well known form of motor truck embodying longitudinally extending truck frame members 1 that are mounted in the usual manner on truck wheels of the ordinary form of construction but it will be understood that the same may be applied to any form of vehicle whereon power is available to move the load carrying body.

In accordance with my invention I provide at intervals upon the frame members 1 a plurality of transverse supports that are spaced from each other, as shown and that are each preferably composed of two channel bars 2 arranged back to back slightly spaced apart in such a manner as to form bunks upon which a load carrying body or deck 4 may be movably mounted.

The deck 4 is provided on its bottom side with fixedly mounted transverse rack bars 9 that rest upon and mesh with gear wheels 8 on shafts 15 that extend lengthwise of the frame members 1 across the transverse supports 2 and are journaled in bearings 3 that are secured to the transverse supports 2. Three of the shafts 15 are preferably provided one at each side and one in the medial plane of the truck frame.

The three shafts 15 are interconnected at both ends by link belts 12 that pass around sprocket wheels 16 on the shafts 15 in such a manner as to cause all of said shafts to be rotated simultaneously at the same rate of speed and in the same direction when power is applied to any one of such shafts. The shafts 15 are preferably driven by a link belt 11 that passes over a sprocket wheel 17 on the centrally located shaft 15 and is connected with any suitable reversible power take off mechanism, not shown, by which it may be driven, preferably by power derived from the motor that drives the vehicle.

The gear racks 9 are preferably provided on both sides with shrouds 18 of well known form that project over the sides of the gear wheels 8 and prevent sidewise movement of the gear racks on the gear wheels.

Figure 4:
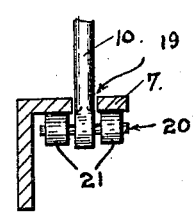
Fig. 4 is a detail showing certain track members and showing the roller means for movably connecting the load carrying body to the track members.

Secured to one of the transverse channel bars 2 of each pair of such bars is a track member 7, see Fig. 4, that is curved downwardly at both ends as at 7' and that is provided with a longitudinally extending slot 19 through which projects a shank 10. The upper end of each shank 10 is rigidly secured to the deck 4 midway between the two sides thereof and the lower end of each shank 10 is provided with a transverse bearing pin 20 which projects in both directions from the shank and has rollers 21 mounted thereon, said rollers being adapted to roll on the lower surface of the track member 11. The ends 7' of the track members 7 curve downwardly on a radius whose center is the center of the shafts 15.

Loosely mounted on each of the side shafts 15 between adjacent sets of the transverse supports 2 are arms 5 that normally rest upon the frame members 1 but that are arranged to be engaged by pins 6' on members 6 that are secured to the shafts 15 and lifted into engagement with the deck 4 to thereby exert an upward pressure on the deck and cause the same to be tilted at the instant the deck reaches a proper dumping position. As the deck moves back to its normal position the arms 5 are lowered onto the frame members 1 as shown.

The truck body is held in the horizontal mid position by a locking dog 22 that is fulcrumed as at 23 and is arranged to engage within a notch 24 in a catch member 13 said catch member 13 being beveled as at 25 on each side of the notch 24 so that as the body 4 approaches a mid position from either side the inclined surface 25 will engage with the locking dog and move the same in such a manner as to cause it to register with and drop into the notch 24. The lower end of the locking dog is connected by a rod 14 with suitable mechanism, not shown, by which said locking dog may be moved to release the deck 4 the said mechanism preferably being operable from the driver's seat and including means for normally causing the locking dog 22 to snap into the notch 24 when the notch is moved opposite the locking dog.

The load carrying body 4 may be moved to either side of its normal carrying position by first withdrawing the locking dog 22 and then selectively causing the shaft 15 to rotate in either direction thus rotating all of the gear wheels 8 simultaneously in the same direction and at the same rate of speed and thereby moving the body 4 to either side. When the body 4 reaches a point in its sidewise movement where the rollers 21 begin to roll onto the curved ends 7' of the tracks 7 such body will be substantially balanced on the gear wheels 8 on that side of the frame and, if the weight of the body 4 and any load thereon is evenly distributed such body will be easily tilted into a dumping position. At the instant the body 4 reaches the balanced or dumping position the arms 5 on the shaft 15 over which the body 4 is balanced will engage the bottom side of such body 4 and in response to further rotation of the shafts 15 will exert an upward lift on the body 4 and cause it to tilt.

Figure 1:
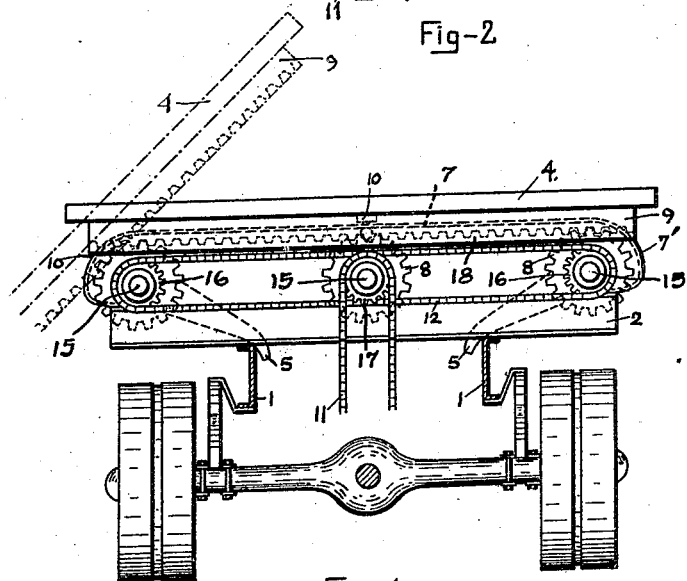

As the body tilts into an inclined position as shown by broken lines in Fig. 1 the rollers 21 will follow around the curved track surfaces 7' and will hold the racks 9 in mesh with the gear wheels 8 so that when the direction of rotation of the gear wheels 8 is reversed the body 4 will first be tilted by reason of the shanks 10 into a horizontal position and will then be returned to its normal load carrying position on the truck frame.

The tilting movement of the body 4 may be stopped at any point by stopping the movement of rotation of the gear wheels 8 but if the gear wheels 8 are not voluntarily stopped the tilting movement of the body will be stopped by engagement of the shanks 10 with ends of the slots 19.

The ends 7' of the track members are curved on a radius whose center coincides with the center of the shafts 15 so that as the body 4 tilts into an inclined position the racks 9 will be held in mesh with the gear wheels 8 by the rollers 21 and shanks 10 and when the direction of rotation of the gear wheels is reversed the said rollers 21 and shanks 10 will swing the body 4 back into a horizontal position as they move onto the straight sections of the tracks.

This apparatus may be used on any form of truck, car, or load carrying vehicle on which suitable power for operating the same is available and any form of body may be provided instead of the platform 4. The same principles of construction may be applied to a rear delivery unloading apparatus.

I am aware that, prior to my invention, unloading apparatus in the nature of pivoted swinging bodies have been patented, but I do claim to be the original inventor of unloading devices comprising a horizontally movable body that is arranged to tilt when it reaches a predetermined position at the sides or ends of the vehicle frame on which it is installed.

The foregoing description taken in connection with the accompanying drawings clearly discloses the plan of construction and method of operation of this apparatus, but it will be understood that the drawings are merely illustrative and that such changes in said apparatus may be made as are within the scope of the following claims.

What I claim is:

1. Unloading apparatus of the class described including a supporting frame, shafts journaled on said supporting frame, gear wheels on said shafts, a load carrying body, gear racks rigid with said load carrying body and arranged to run on said gear wheels, means for selectively rotating said gear wheels in either direction to move said body into an overhanging position with respect to said frame, slotted trackways rigid with said supporting frame and arranged parallel with said gear racks, said trackways being curved downwardly at the ends and devices movable in said slotted track ways and connected with said load carrying body for holding said gear racks in mesh with said gear wheels.

2. Unloading apparatus of the class described including a supporting frame, shafts journaled for rotation along opposite sides of said supporting frame, gear wheels secured on said shafts, other gear wheels mounted for rotation between said two shafts, a load carrying body, gear racks rigid with said load carrying body and arranged to run on said gear wheels, means for selectively rotating said gear wheels in either direction to move said load carrying body into a substantially balanced position on the gear wheels on either side of said frame, slotted trackways rigid with said supporting frame and parallel with said gear racks, the ends of said trackways being curved downwardly on a radius whose center is the center of said shafts, and roller devices arranged to run in said trackways and connected with said load carrying body for holding said rack bars in mesh with said gear wheels when said load carrying body is in either a horizontal or an inclined position.

3. Unloading apparatus of the class described including a vehicle frame, track members extending crosswise of said vehicle frame at intervals throughout the length thereof, said track members being curved downwardly at their outer ends, gear wheels located in a common plane at the respective ends and at the center of each of said track members, means for selectively rotating said gear wheels in either direction, a load carrying body, gear racks on said load carrying body and arranged to run on said gear wheels, means for engaging with the load carrying body to tilt the same when said load carrying body is moved into an overhanging position with respect to the gear wheels on one end of said track members, rollers arranged to run in each of said track members and rigid means connecting said rollers with said load carrying body midway between the two sides thereof.

4. Unloading apparatus of the class described including a vehicle frame, supporting members extending crosswise of said vehicle frame at spaced intervals, longitudinally arranged shafts mounted for rotation at the respective ends and at the center of said supporting members, means interconnecting said shafts for rotating all of said shafts simultaneously in the same direction and at the same rate of speed, gear wheels secured to said shafts adjacent said supporting members, slotted trackways secured to said supporting members and having their ends curved downwardly on a radius whose center coincides with the center of the shafts at the ends of the supporting members, a load carrying body, gear racks secured to the load carrying body and arranged to run on said gear wheels, roller devices arranged to run in said trackways and connected with said load carrying body midway between the two sides thereof to normally hold said load carrying body horizontal and to permit said load carrying body to assume an angular position when the rollers move onto the curved portions at the ends of the trackways, means on said shafts for tilting said load carrying body when the latter is moved into an overhanging position with respect to the ends of said supporting members and means arranged to be connected with the power unit of the vehicle for rotating said shafts.

HUGO V. STUTH.